(12) United States Patent
Ovalle et al.

(10) Patent No.: US 10,315,923 B2
(45) Date of Patent: Jun. 11, 2019

(54) SHEET MANUFACTURING DEVICE AND SHEET MANUFACTURING METHOD

(71) Applicants: LINTEC OF AMERICA, INC., Phoenix, AZ (US); LINTEC CORPORATION, Tokyo (JP)

(72) Inventors: Raquel Ovalle, Phoenix, AZ (US); Carter Haines, Phoenix, AZ (US)

(73) Assignees: LINTEC OF AMERICA INC., Phoenix, AZ (US); LINTEC CORPORATION, Tokyo (JP)

( * ) Notice: Subject to any disclaimer, the term of this patent is extended or adjusted under 35 U.S.C. 154(b) by 557 days.

(21) Appl. No.: 14/615,231

(22) Filed: Feb. 5, 2015

(65) Prior Publication Data
US 2016/0229113 A1 Aug. 11, 2016

(51) Int. Cl.
*C01B 32/168* (2017.01)
*B82Y 40/00* (2011.01)
*B29L 31/00* (2006.01)

(52) U.S. Cl.
CPC ....... *C01B 32/168* (2017.08); *B29L 2031/731* (2013.01); *B82Y 40/00* (2013.01)

(58) Field of Classification Search
CPC ............... B29C 55/30; C01B 31/0253; B29L 2031/731; B82Y 40/00; B82Y 30/00; B28B 11/14; B32B 38/10; B32B 9/00; B32B 38/0004

USPC ............. 425/383; 264/145; 428/408; 156/64
See application file for complete search history.

(56) References Cited

U.S. PATENT DOCUMENTS

| | | |
|---|---|---|
| 2007/0237959 A1 | 10/2007 | Lemaire |
| 2008/0018012 A1* | 1/2008 | Lemaire ................. B82Y 30/00 264/82 |
| 2011/0036477 A1* | 2/2011 | Kato ...................... B65H 29/54 156/64 |
| 2011/0278758 A1* | 11/2011 | Liu ........................ B82Y 30/00 264/145 |

FOREIGN PATENT DOCUMENTS

JP    2009-091240 A    4/2009

* cited by examiner

*Primary Examiner* — Matthew J Daniels
*Assistant Examiner* — Yunju Kim
(74) *Attorney, Agent, or Firm* — McDermott Will & Emery LLP

(57) ABSTRACT

A sheet manufacturing device includes: a holder configured to hold a grown form of carbon nanotubes; a drawing unit configured to draw the carbon nanotubes from the grown form held by the holder; and a support unit configured to support the carbon nanotubes drawn by the drawing unit, the drawing unit including: a single drawing member configured to draw the carbon nanotubes; and a movable unit configured to move the drawing member, the drawing unit bringing the drawn carbon nanotubes to be supported by the support unit.

19 Claims, 2 Drawing Sheets

SHEET MANUFACTURING DEVICE AND SHEET MANUFACTURING METHOD

TECHNICAL FIELD

The present invention relates to a sheet manufacturing device and a sheet manufacturing method.

BACKGROUND ART

A sheet manufacturing device for manufacturing a carbon nanotube sheet has been known (see, for instance, Patent Literatures 1 and 2).

Patent Literature 1: U.S. Patent Application Publication No. 2007/237959

Patent Literature 1: JP-A-2009-91240

A typical sheet manufacturing device as disclosed in Patent Literatures 1 and 2, however, requires a plurality of drawing members for drawing carbon nanotubes, a movement mechanism for moving each of the drawing members, an attachment/detachment mechanism for attaching/detaching each of the drawing members to/from the movement mechanism, and the like, so that the machine size is inevitably increased with an increase in the number of components of the machine. Further, a cutter for cutting a carbon nanotube sheet is independently provided, which results in a further increase in the number of components of the machine and in the machine size.

SUMMARY OF THE INVENTION

An object of the invention is to provide a sheet manufacturing device and a sheet manufacturing method capable of restraining an increase in the number of components and in a machine size.

According to a first aspect of the invention, a sheet manufacturing device includes: a holder configured to hold a grown form of carbon nanotubes; a drawing unit configured to draw the carbon nanotubes from the grown form held by the holder; and a support unit configured to support the carbon nanotubes drawn by the drawing unit, the drawing unit including: a single drawing member configured to draw the carbon nanotubes; and a movable unit configured to move the drawing member, the drawing unit bringing the drawn carbon nanotubes to be supported by the support unit.

According to a second aspect of the invention, a sheet manufacturing device includes: a holder configured to hold a grown form of carbon nanotubes; a drawing unit configured to draw the carbon nanotubes from the grown form held by the holder; and a support unit configured to support the carbon nanotubes drawn by the drawing unit, the drawing unit including: a single drawing member configured to draw the carbon nanotubes; and a cutter configured to cut the carbon nanotubes supported by the support unit, the drawing member functioning as the cutter to cut the carbon nanotubes.

In the above aspect(s), it is preferable that the support unit include a first support member and a second support member that are configured to support the drawn carbon nanotubes, the first support member and the second support member being disposed at positions where the drawn carbon nanotubes are brought into contact first with the first support member and then with the second support member as the drawing member is moved to the support member by the movable unit.

In the above aspect(s), it is preferable that the drawing unit cut the carbon nanotubes supported by the support unit from a side opposite to the support unit across the carbon nanotubes.

In the above aspect(s), it is preferable that the drawing member have a circular cross section.

In a third aspect of the invention, a sheet manufacturing method includes: holding a grown form of carbon nanotubes; moving a single drawing member configured to draw the carbon nanotubes from the held grown form; and bringing the carbon nanotubes drawn by moving the drawing member to be supported by the support unit.

In a fourth aspect of the invention, a sheet manufacturing method includes: holding a grown form of carbon nanotubes; drawing the carbon nanotubes from the held grown form with a single drawing member; supporting the drawn carbon nanotubes; and cutting the supported carbon nanotubes with the drawing member.

In the above aspect(s), the single drawing member is moved by the movable unit to draw the carbon nanotubes until the carbon nanotubes are supported by the support unit. Therefore, a plurality of drawing members, a movement mechanism for moving each of the plurality of drawing members, an attachment/detachment mechanism for attaching/detaching each of the drawing members to/from the movement mechanism, and the like are not required, which results in restraining an increase in the number of components and in a machine size.

Further, in the above aspect(s), the drawing member also functions as a cutter, so that it is not necessary to provide a cutter independent of the drawing unit, which also results in restraining an increase in the number of components and in the machine size.

When the first support member and the second support member are disposed at positions where the carbon nanotubes are brought into contact first with the first support member and then with the second support member, the carbon nanotubes, which are supported by the first support member, can be drawn with tension being applied thereto until the carbon nanotubes are supported by the second support member. The carbon nanotubes can thus be supported by the first support member and the second support member without loosely hanging therebetween.

The carbon nanotubes are cut from the side opposite to the support unit. Therefore, since the carbon nanotubes can be cut while being supported by the support unit, the carbon nanotubes can be cut at a predetermined position without causing any slack or wrinkle in the sheet, thereby manufacturing a slack- or wrinkle-free carbon nanotube sheet with a uniform length.

When the drawing member has a circular cross section, the drawing member can be brought into contact with the carbon nanotubes with a large contact area to cut the carbon nanotubes as compared with the case where the contact part of the drawing member is sharpened. The large contact area increases a friction force between the carbon nanotubes and the drawing member, so that the carbon nanotubes can be sharply cut to manufacture a slack- or wrinkle-free carbon nanotube sheet with a uniform length.

BRIEF DESCRIPTION OF DRAWING(S)

DESCRIPTION OF EMBODIMENT(S)

Figure 1:
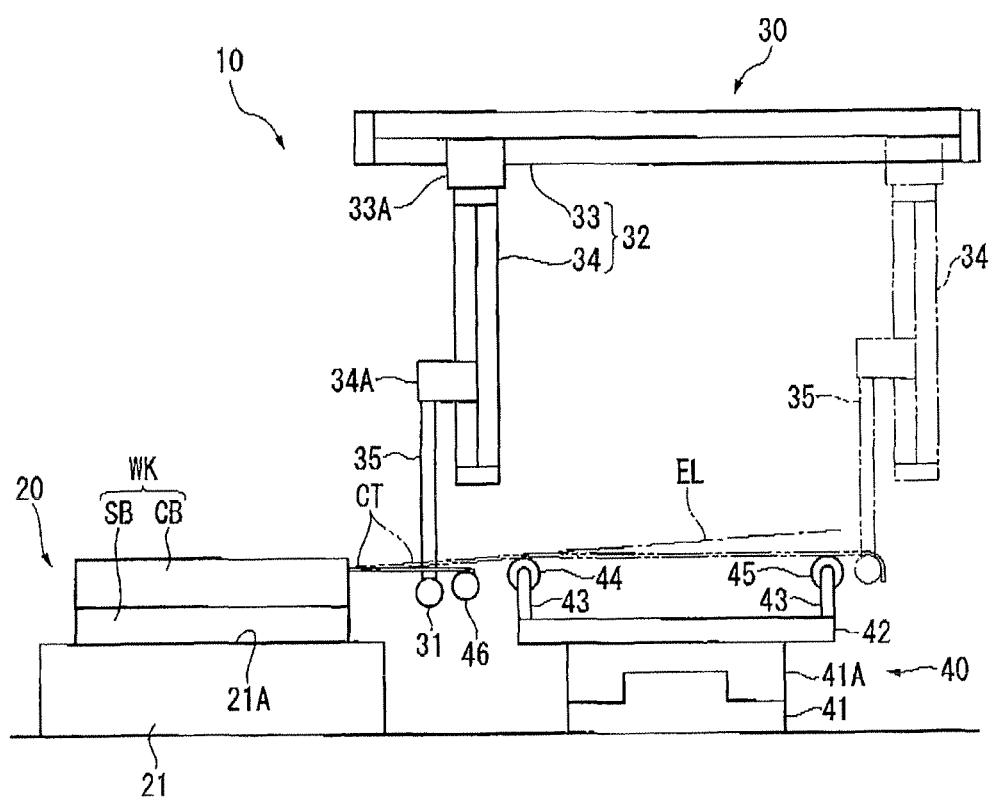
FIG. 1 is a side view showing a sheet manufacturing device according to an exemplary embodiment of the invention.

Exemplary embodiment(s) of the invention will be described below with reference to the attached drawings.

It should be noted that in the following description, directions such as "upper", "lower", "right", "left", "front" and "back" without specifying a drawing to be referred to should be defined with reference to FIG. 1 as seen in a normal direction (i.e., a direction where attached reference numerals are each seen in a proper position), "upper", "lower", "right" and "left" being defined as directions parallel with the plane of FIG. 1, "front" being defined as a near side in a direction perpendicular to the plane of FIG. 1, "back" being defined as a far side in the direction perpendicular to the plane of FIG. 1.

As shown in FIG. 1, a sheet manufacturing device 10 includes: a holder 20 for holding a forest (also referred to as an array) CB of carbon nanotubes CT (i.e., a grown form of the carbon nanotubes CT); a drawing unit 30 for drawing the carbon nanotubes CT from the forest CB held by the holder 20; and a support unit 40 for supporting the carbon nanotubes CT drawn by the drawing unit 30. It should be noted that the forest CB, which is formed by growing the carbon nanotubes CT on a first surface of a substrate SB, is provided in the form of an integrated workpiece WK together with the substrate SB on which the forest CB is supported.

The holder 20 includes a table 21 with a holding surface 21A on which the integrated workpiece WK (i.e., a second surface of the substrate SB opposite to the first surface) is sucked and held by using any decompression device such as a decompression pump and a vacuum ejector (not shown).

The drawing unit 30 includes a single drawing member 31 that draws the carbon nanotubes CT and a movable unit 32 that moves the drawing member 31. The drawing member 31 is elongated in a direction perpendicular to a drawing direction of the carbon nanotubes CT (i.e., in a front-back direction) and has a circular cross section. The movable unit 32 includes a linear motor 33 (a driver) and a linear motor 34 (a driver) supported by a slider 33A of the linear motor 33. The drawing member 31 is supported by a slider 34A of the linear motor 34 via a bracket 35. In the exemplary embodiment, the drawing member 31 also functions as a cutter for cutting the carbon nanotubes CT supported by the support unit 40.

The support unit 40 includes: a linear motor 41 (a driver); a base plate 42 supported by a slider 41A of the linear motor 41; a first support member 44 and a second support member 45 each supported by the base plate 42 via a bracket 43 to support the drawn carbon nanotubes CT; and a third support member 46 disposed between the table 21 and the first support member 44 at a predetermined position to support drawn ends of the carbon nanotubes CT.

The first support member 44 and the second support member 45 are disposed such that the drawn carbon nanotubes CT are brought into contact with the first support member 44 and the second support member 45 in this sequence as the movable unit 32 moves the drawing member 31 across the support unit 40. In the exemplary embodiment, an upper end of the first support member 44 and an upper end of the second support member 45 are disposed above a drawing start position of the carbon nanotubes CT defined in the forest CB, and arranged in parallel with each other at a predetermined interval in the drawing direction of the carbon nanotubes CT (i.e., a right-left direction). The second support member 45 is disposed below an extension line EL extending from the drawing start position of the carbon nanotubes CT defined in the forest CB through the upper end of the first support member 44. Each of the first support member 44 and the second support member 45 is elongated in the front-back direction to have a sufficient length for supporting a plurality of carbon nanotube sheets CS, and is movable in the front-back direction with the assistance of the linear motor 41.

Description will be made on a process for manufacturing the carbon nanotube sheet CS with the sheet manufacturing device 10 (FIG. 2).

First, on the sheet manufacturing device 10, each member of which is set at an initial position as shown by solid lines in FIG. 1, the integrated workpiece WK is mounted on the holding surface 21A at a predetermined position by an operator or a transport unit such as a belt conveyer (not shown). Next, the holder 20 drives the decompression device (not shown) to suck and hold the integrated workpiece WK on the holding surface 21A. Subsequently, the operator draws the carbon nanotubes CT from the forest CB to set the drawn ends of the carbon nanotubes CT on the third support member 46 as shown by solid lines in FIG. 1. The drawn carbon nanotubes CT, which are attached together by Van der Waals force, are aligned in the form of a belt along the drawing direction.

Figure 2A:
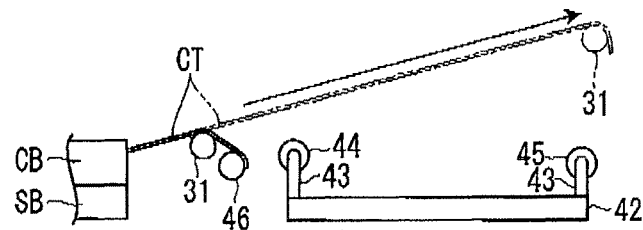
FIGS. 2A to 2F illustrate an operation of the sheet manufacturing device shown in FIG. 1.
Figure 2B:
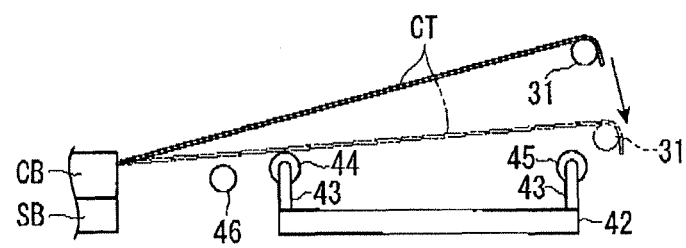
Figure 2C:
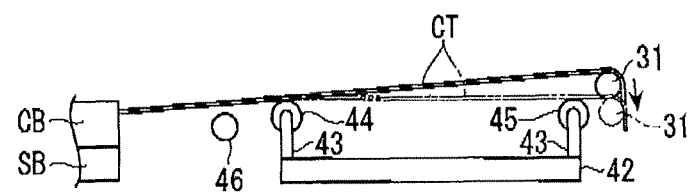

When the operator inputs a signal for starting an automatic operation through any input device such as an operation panel and a personal computer (not shown), the drawing unit 30 drives the linear motors 33, 34 to lift the drawing member 31 so that the drawn ends of the carbon nanotubes CT are supported by the drawing member 31 as shown by solid lines in FIG. 2A. Subsequently, as shown by chain double-dashed lines in FIG. 2A, the drawing member 31 is moved obliquely right upward (i.e., upwardly away from support unit 40) to draw the carbon nanotubes CT from the forest CB. At this time, the carbon nanotubes CT, which are attached together by Van der Waals force, are drawn in the form of a belt. Subsequently, the drawing unit 30 drives the linear motors 33, 34 to move the drawing member 31 obliquely right downward (toward the support unit 40 on a downstream side in the drawing direction) as shown in FIG. 2B so that the carbon nanotubes CT are brought into contact with the first support member 44 to be supported thereon. The drawing unit 30 then further drives the linear motors 33, 34 to move the drawing member 31 obliquely right downward, thereby bringing the carbon nanotubes CT into contact with the second support member 45 while applying tension to the carbon nanotubes CT as shown in FIG. 2C. The carbon nanotubes CT are thus supported by the second support member 45.

Figure 2D:
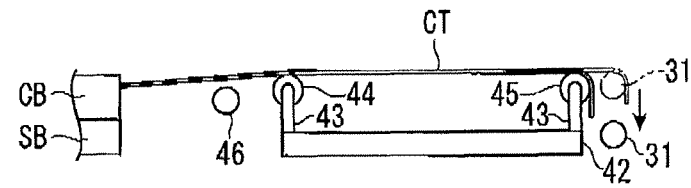
Figure 2E:
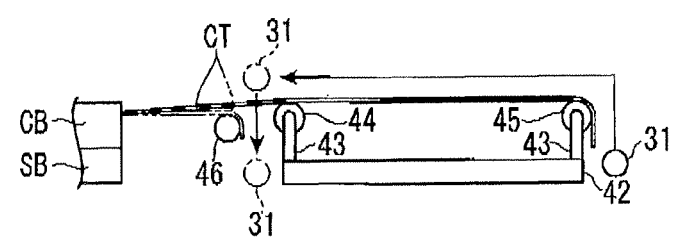
Figure 2F:
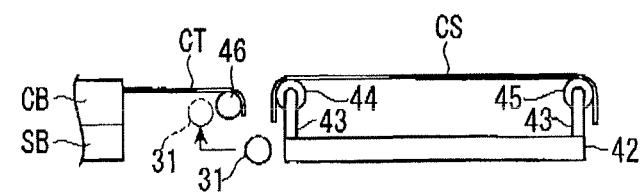

Subsequently, the drawing unit 30 drives the linear motor 34 to move the drawing member 31 further downward as shown in FIG. 2D, thereby separating the drawing member 31 from the carbon nanotubes CT. The drawing unit 30 then drives the linear motors 33, 34 to move the drawing member 31 to a position above the first support member 44 and the third support member 46 as shown by an upper chain double-dashed line in FIG. 2E. The drawing unit 30 then drives linear motor 34 to move the drawing member 31 downward as shown by a lower chain double-dashed line in FIG. 2E, thereby cutting the carbon nanotubes CT supported by the support unit 40 from the side opposite to the support unit 40 across the carbon nanotubes CT. The carbon nanotubes CT thus have rear ends and new drawn ends. Simultaneously, as shown in FIG. 2F, the carbon nanotube sheet CS, which is supported by the first support member 44 and the second support member 45, is manufactured, while the new drawn ends are supported by the third support member 46.

Subsequently, the drawing unit 30 drives the linear motors 33, 34 to move the drawing member 31 to the initial position as shown by a chain double-dashed line in FIG. 2F. The support unit 40 drives the linear motor 41 to move the first support member 44 and the second support member 45 forward or backward so that the carbon nanotubes CT to be next drawn can be supported at a position adjacent to the manufactured carbon nanotube sheet CS. The above operation is repeated to manufacture the carbon nanotube sheets CS continuous in the front-back direction.

In the above exemplary embodiment, the single drawing member 31 is moved by the movable unit 32 to draw the carbon nanotubes CT until the carbon nanotubes CT are supported by the support unit 40. Therefore, a plurality of drawing members, a movement mechanism for moving each of the plurality of drawing members, attachment/detachment mechanism for attaching/detaching each of the drawing members to/from the movement mechanism, and the like are not required, which results in restraining an increase in the number of components and in a machine size.

Further, the drawing member 31 also functions as a cutter, so that it is not necessary to provide a cutter independent of the drawing unit 30, which also results in restraining an increase in the number of components and in the machine size.

Although the best arrangement, method, and the like for carrying out the invention have been described above, the scope of the invention is not limited thereto. In other words, while the invention has been particularly explained and illustrated mainly in relation to a specific embodiment, a person skilled in the art could make various modifications in terms of shape, material, quantity or other particulars to the above described embodiment without deviating from the technical idea or any object of the invention. Further, any descriptions of shape, material or the like disclosed above are given as examples to enable easy understanding of the invention, and do not limit the invention, so that descriptions using names of components, with any such limitations of shape, material or the like removed in part or whole, are included in the present invention.

For instance, the holder 20 may hold the integrated workpiece WK with a chuck (e.g., a mechanical chuck and a chuck cylinder), Coulomb's force, adhesive agent, adhesive sheet, magnetic force, or the like.

Alternatively, the holder 20 may directly hold the forest CB itself on the holding surface 21A.

The drawing unit 30 may horizontally draw the carbon nanotubes CT. In this case, the first support member 44 may be disposed below the drawn carbon nanotubes CT, and the second support member 45 may be disposed further below the first support member 44.

The drawing unit 30 may include any cutter such as a laser cutter, a heat cutter, an air cutter and a compressed-water cutter, and the cutter may be provided to the drawing member 31.

In the drawing unit 30, it is not necessary that the drawing member 31 functions as a cutter. In this case, a cutter independent of the drawing member 31 may be separately provided.

The drawing unit 30 may include a drawing member made of a blade material, rubber, resin, sponge or the like.

The cross section of the drawing member 31 may be circular, oval, polygonal (e.g., triangular and rectangular), or the like.

The drawing member 31 may be directly supported by the movable unit not via the bracket 35.

In the support unit 40, the carbon nanotube sheet CS may be supported by three support members including the first support member 44, the second support member 45 and another support member disposed therebetween, or, alternatively, may be supported by either one of the first support member 44 and the second support member 45.

It is not necessary that the support unit 40 includes the linear motor 41. In this case, the first support member 44 and the second support member 45 may be replaced every time when the carbon nanotube sheet CS is manufactured. The carbon nanotube sheet CS supported by the first support member 44 and the second support member 45 may be transported by a transport unit. The carbon nanotubes CT drawn by the drawing member 31 may be layered on the carbon nanotube sheet CS on the first and second support members 44, 45.

The support unit 40 may include a movable unit for vertically moving at least one of the first support member 44 and the second support member 45.

As long as the second support member 45 is disposed below the extension line EL extending from the forest CB through the upper end of the first support member 44, it is not necessary that the first support member 44 and the second support member 45 are disposed in parallel with each other.

In the support unit 40, the carbon nanotubes CT may be supported with a sticky agent or an adhesive agent. Alternatively, the carbon nanotubes CT may be supported, for instance, in a sucking, holding or frictional manner.

The support member(s) may be any sheet, film, tape or the like in any shape, or, alternatively, may be a member or an article in any shape, such as resin container, glass plate, steel plate, pottery, wooden plate and resin plate.

The method and process according to the invention are by no means limited as long as the operations, functions or steps explained in relation thereto can be performed, and are, of course, not limited to the arrangements and processes described merely as examples in the exemplary embodiment at all. For instance, any holder considered within a technical range in light of technical knowledge at the time of filing of the present application is usable as long as the holder can hold the grown form of the carbon nanotubes (the explanation of any other method and process is omitted).

The driver(s) in the above exemplary embodiment may be any of motorized equipment such as a rotary motor, a linear movement motor, a linear motor, a single-axis robot and an articulated robot, actuators such as an air cylinder, a hydraulic cylinder, a rodless cylinder and a rotary cylinder, and any direct or indirect combination thereof (including the arrangements exemplarily described in the exemplary embodiment).

The invention claimed is:

1. A sheet manufacturing device comprising:
    a holder configured to hold a substrate and carbon nanotubes disposed on a surface of the substrate;
    a drawing unit configured to draw the carbon nanotubes from the holder, the drawing unit comprising:
        a single drawing member configured to draw the carbon nanotubes; and
        a movable unit configured to move the single drawing member;
    a support unit configured to support the carbon nanotubes drawn by the drawing unit; and
    a support member disposed between the holder and the support unit, wherein the movable unit is configured to:
move the single drawing member from a drawing start position to draw a first part of the carbon nanotubes over the support member and the support unit;
separate the first part of the carbon nanotubes from the single drawing member after drawing the first part of the carbon nanotubes over the support unit; and
subsequently return the moved single drawing member to the drawing start position by passing the moved single drawing member under the support member to cut the first part of the carbon nanotubes and to redraw a second part of the carbon nanotubes with the moved single drawing member.

2. The sheet manufacturing device according to claim 1, wherein the support unit comprises a first support member and a second support member that are configured to support the drawn carbon nanotubes, the first support member and the second support member being disposed at positions where the drawn carbon nanotubes are brought into contact first with the first support member and then with the second support member as the single drawing member is moved over the support unit by the movable unit.

3. The sheet manufacturing device of claim 1, further comprising a decompression device for providing negative pressure proximate to an interface between the holder and the carbon nanotubes disposed on the substrate.

4. The sheet manufacturing device of claim 1, wherein the drawing unit further comprises:
a bracket connected to the single drawing member;
a first slider connected to the bracket, the first slider configured for movement in a first direction perpendicular to the surface of the substrate; and
a first linear motor connected to the first slider, the linear motor configured for translating the first slider in the first direction.

5. The sheet manufacturing device of claim 4, wherein the drawing unit further comprises:
a second slider connected to the first linear motor; and
a second linear motor connected to the second slider, the second linear motor configured for translating the second slider in a second direction parallel to the surface of the substrate and perpendicular to the first direction.

6. The sheet manufacturing device of claim 5, wherein the single drawing member is an elongate cylinder having a circular cross section and an elongate axis in a direction perpendicular to the first direction and the second direction.

7. The sheet manufacturing device of claim 1, wherein the single drawing member is an elongate cylinder having a circular cross section and an elongate axis in a direction perpendicular to a drawing direction of the carbon nanotubes.

8. The sheet manufacturing device of claim 1, wherein the support unit further comprises:
a base plate having a first surface, a first end proximate to the holder, and a second end opposite the first end;
a first support member connected to the first surface at the first end of the base plate and a second support member connected to the first surface at the second end of the base plate;
a support member slider connected to a second surface of the base plate opposite the first surface; and
a linear motor connected to the support member slider.

9. The sheet manufacturing device according to claim 8, wherein the first support member and the second support member are configured to support the drawn carbon nanotubes, and the first support member at the first end and the second support member at the second end are disposed at positions where the drawn carbon nanotubes are brought into contact first with the first support member and then with the second support member as the single drawing member is moved to the support member by the movable unit.

10. A sheet manufacturing device comprising:
a holder configured to hold a grown form of carbon nanotubes;
a drawing unit comprising a drawing member and configured to draw the carbon nanotubes from the holder using the drawing member; and
a support unit configured to support the carbon nanotubes drawn by the drawing unit, wherein
the drawing unit is configured to move the drawing member from a first position to a second position to draw the carbon nanotubes over the support unit,
the drawing unit is configured to return the drawing member from the second position to the first position after the drawing unit draws the carbon nanotubes over the support unit, and
the drawing member is configured to cut the carbon nanotubes supported by the support unit while returning from the second position to the first position.

11. The sheet manufacturing device according to claim 10, wherein the drawing unit cuts the carbon nanotubes supported by the support unit from a side opposite to the support unit across the carbon nanotubes.

12. The sheet manufacturing device according to claim 10, wherein the drawing member has a circular cross section.

13. A sheet manufacturing method using the sheet manufacturing device according to claim 1, the sheet manufacturing method comprising:
holding, by the holder, the substrate and the carbon nanotubes disposed on the surface of the substrate;
moving, by the movable unit, the single drawing member from the drawing start position to draw, over the support member and the support unit, the first part of the carbon nanotubes disposed on the surface of the substrate; and
bringing the first part of the carbon nanotubes drawn over the support member and the support unit by moving the single drawing member into contact with the support unit by which the first part of the carbon nanotubes are supported;
separating, by the movable unit, the first part of the carbon nanotubes after the first part of the carbon nanotubes is drawn over the support member and the support unit and brought in contact with the support unit; and
subsequently returning, by the movable unit, the moved single drawing member to the drawing start position by passing the moved single drawing member under the support member to cut the first part of the carbon nanotubes and to redraw the second part of the carbon nanotubes with the moved singled drawing member.

14. The sheet manufacturing method of claim 13, further comprising:
attaching a leading edge of the drawn carbon nanotubes to a third immobile support member; and
contacting the single drawing member with an underside of the drawn carbon nanotubes after attaching the leading edge to the third immobile support member.

15. The sheet manufacturing method of claim 14, further comprising releasing contact between the single drawing member and the underside of the drawn carbon nanotubes responsive to contacting the underside of the drawn carbon nanotubes with at least one support member of the support unit.

16. The sheet manufacturing method of claim 15, further comprising cutting the drawn carbon nanotubes by returning the single drawing member to a location between the third immobile support member and the holder and applying pressure through an arcuate surface of the single drawing member to a top surface of the carbon nanotubes opposite the underside.

17. The sheet manufacturing method of claim 13, further comprising providing negative pressure proximate to an interface between the holder and the carbon nanotubes disposed on the substrate.

18. The sheet manufacturing method of claim 16, wherein the cutting creates a new leading edge and attaches the new leading edge to the third immobile support member.

19. A sheet manufacturing method using the sheet manufacturing device according to claim 10, the sheet manufacturing method comprising:
- holding, by the holder, the grown form of carbon nanotubes;
- moving the drawing member from the first position to the second position to draw the carbon nanotubes from the grown form held by the holder and over the supporting unit;
- supporting, by the supporting unit, the carbon nanotubes drawn over the supporting unit; and
- cutting, by the drawing member, the supported carbon nanotubes while retuning the drawing member from the second position to the first position.

* * * * *